United States Patent
Hirata et al.

(10) Patent No.: US 7,532,407 B2
(45) Date of Patent: May 12, 2009

(54) PROJECTION DISPLAY

(75) Inventors: Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/500,993

(22) Filed: Aug. 9, 2006

(65) Prior Publication Data

US 2007/0035802 A1 Feb. 15, 2007

(30) Foreign Application Priority Data

Aug. 9, 2005 (JP) ............................. 2005-231052

(51) Int. Cl.
*G02B 27/14* (2006.01)
*G03B 21/14* (2006.01)
*G03B 21/00* (2006.01)
*G02F 1/1335* (2006.01)

(52) U.S. Cl. .................. 359/629; 359/634; 353/20; 353/31; 353/84; 353/100; 353/119; 349/5; 349/8

(58) Field of Classification Search ................. 359/629, 359/630–634, 618; 353/20, 30, 31, 34, 84, 353/100, 119; 349/5, 8
See application file for complete search history.

(56) References Cited

U.S. PATENT DOCUMENTS

| | | | |
|---|---|---|---|
| 6,334,686 B1 | 1/2002 | Shiraishi et al. | |
| 6,587,167 B1 * | 7/2003 | Fujimori et al. | ............... 349/58 |
| 6,639,743 B2 | 10/2003 | Watanabe | |
| 6,910,773 B2 * | 6/2005 | Nakashima et al. | ........... 353/20 |
| 6,919,992 B2 * | 7/2005 | Koyama | ..................... 359/629 |
| 2003/0071975 A1 | 4/2003 | Fujimori et al. | |

FOREIGN PATENT DOCUMENTS

| | | |
|---|---|---|
| CN | 1402081 A | 3/2003 |
| JP | 2001-228534 | 8/2001 |
| JP | 2004-126496 | 4/2004 |
| JP | 2004-184889 | 7/2004 |
| JP | 2004-354795 | 12/2004 |
| JP | 2005-012303 | 1/2005 |

* cited by examiner

*Primary Examiner*—Ricky L Mack
*Assistant Examiner*—Jack Dinh
(74) *Attorney, Agent, or Firm*—Antonelli, Terry, Stout & Kraus, LLP.

(57) ABSTRACT

A projection type image display apparatus is provided which includes a housing to hold an optical system including multi-lenses, a polarized-light conversion element and the color separation portion. The housing operates to provide an optical path between a light source, located outside the housing, and penetration-type image display elements and an optical synthesizing portion also located outside of the housing.

3 Claims, 11 Drawing Sheets

PROJECTION DISPLAY

BACKGROUND OF THE INVENTION

The present invention relates to a projection-type image display apparatus, for modulating light intensity of lights irradiated from an illumination optic system, through liquid crystal image display elements (i.e., panels) for use of lights of R, G and B, in particular, applying polarization effect therein, thereby forming an optic image, and projecting said optic image upon a screen through a projection optic system.

Conventionally, the projection-type image display apparatus was already known by a name, such as, a liquid crystal projector or the like, for example, i.e., containing an optical unit, as well as, an electric source circuit and/or a video driver circuit within a housing thereof, for projecting the optic image that is formed through modulating the light intensity upon the lights from a light source, with applying polarization effect thereto, so as to vary the density for each of pixels, depending on an image signal through light valve elements for use of R-, G- and B-lights, and thereby projecting the said optic image formed onto the screen or the like, by means of a projection lens. Further, at present, as such the light valve element mentioned above is also widely known and practically used, for example, so-called a transmission or a transparent-type liquid crystal panel, or a reflection-type liquid crystal panel, etc.

As the optic unit of such the projection-type image display etc., for example, because of the reasons that the conversion efficiency there of is high and that lights can be easily obtained therewith, being very similar to that irradiated from a point-like light source. However, with such the liquid crystal projector, it is tried to obtain high-brightness, as well as, high-definition, accompanying with large-sizing of a display screen thereof, i.e., adopting a high-output lamp therein (for example, the metal halide lamp having an electric power, being equal to 250 W or larger than that), and for this reason, ill-influences are exerted on the characteristics of the liquid crystal panels, by the heats generating from such the light radiation source of high output, and further the heat-generation of the liquid crystal panels due to irradiation of strong lights from that light radiation source.

Then, conventionally, within such the projector, for the purpose of preventing various portions of the apparatus including the liquid crystal panel (in particular, a lamp and a controller portion thereof) from increasing of temperature, i.e., protecting them from the ill-influences thereof, there is provided a fan for use of air cooling, and thereby introducing/circulating cooling air from an outside of the apparatus into an inside of a housing thereof. Further, as is already known in Japanese Patent Laying-Open No. 2004-354795 (2004), an attempt is made for cooling down the cross dichroic prisms including the liquid crystal panels, which is installed within the housing while being mounted on an attachment member having a cooling fin on one-side surface thereof, thereby to obtain cooling through a cooling air current within that housing.

On the other hand, with the reflection-type liquid crystal panels or the transparent-type liquid crystal panels, to be applied as the light intensity modulating elements within such the optic unit, also demand is made remarkably for small-sizing, as well as, for low-costs thereof, in recent years, and therefore the strong lights emitted from the light radiation source are irradiated upon the liquid crystal panels, each having a smaller surface area thereof. For this reason, the heat generation on the liquid crystal panel due to the light irradiation comes up to be large much more, but on the contrary to that, it is difficult by any possibility, to suppress such the heat-generation on the liquid crystal panel as was mentioned above, fully by only means of the introduction and/or the circulation of cooling air into the inside of the apparatus by means of the air-cooling fan mentioned above.

Then, according to the present invention, by taking the drawbacks of the conventional arts mentioned above into the consideration thereof, i.e., an object thereof is to provide the practical structures of the optic unit, in particular, for enabling to achieve the optical performances desired, depending on necessity thereof, dissolving those deteriorations in performances that are caused due to the heat generation mentioned above, within the projection-type image display apparatus, representatively, such as, the liquid crystal projector, for example, upon which requirements are made strongly for the high-definition, as well as the high-brightness thereof, and in other words, an improved projection-type image display apparatus.

Namely, according to the present invention, first of all, there is provided a projection-type image display apparatus, comprising the followings in a housing thereof: a light source; an illumination optic system; penetration-type image display elements for R-, G- and B-lights; an optical synthesizing means, and a projection lens, wherein the R-light penetration-type image display element, the G-light penetration-type image display element and the B-light penetration-type image display element are attached on surfaces different from each other of the said cross dichroic prisms, for building up the optical synthesizing means, onto which the display elements are attached, in one body, so that the said cross dichroic prisms attached with the display elements thereon can be attached, detachably, while opposing to a surface different from those, on which the display elements are attached, to an incident surface of the projection lens.

Further, according to the present invention, there is also provided a projection-type image display apparatus, comprising the followings in a housing thereof: a light source; an illumination optic system; reflection-type image display elements for R-, G- and B-lights; an optical synthesizing means, and a projection lens, wherein the R-light penetration-type image display element, the G-light penetration-type image display element and the B-light penetration-type image display element are attached with the said cross dichroic prisms for building up the optical synthesizing means, in one body, on optical paths opposing to surfaces thereof different from each other, so that the said cross dichroic prisms attached with the display elements thereon can be attached, detachably, while opposing to a surface different from those, on which the display elements are attached, to an incident surface of the projection lens.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
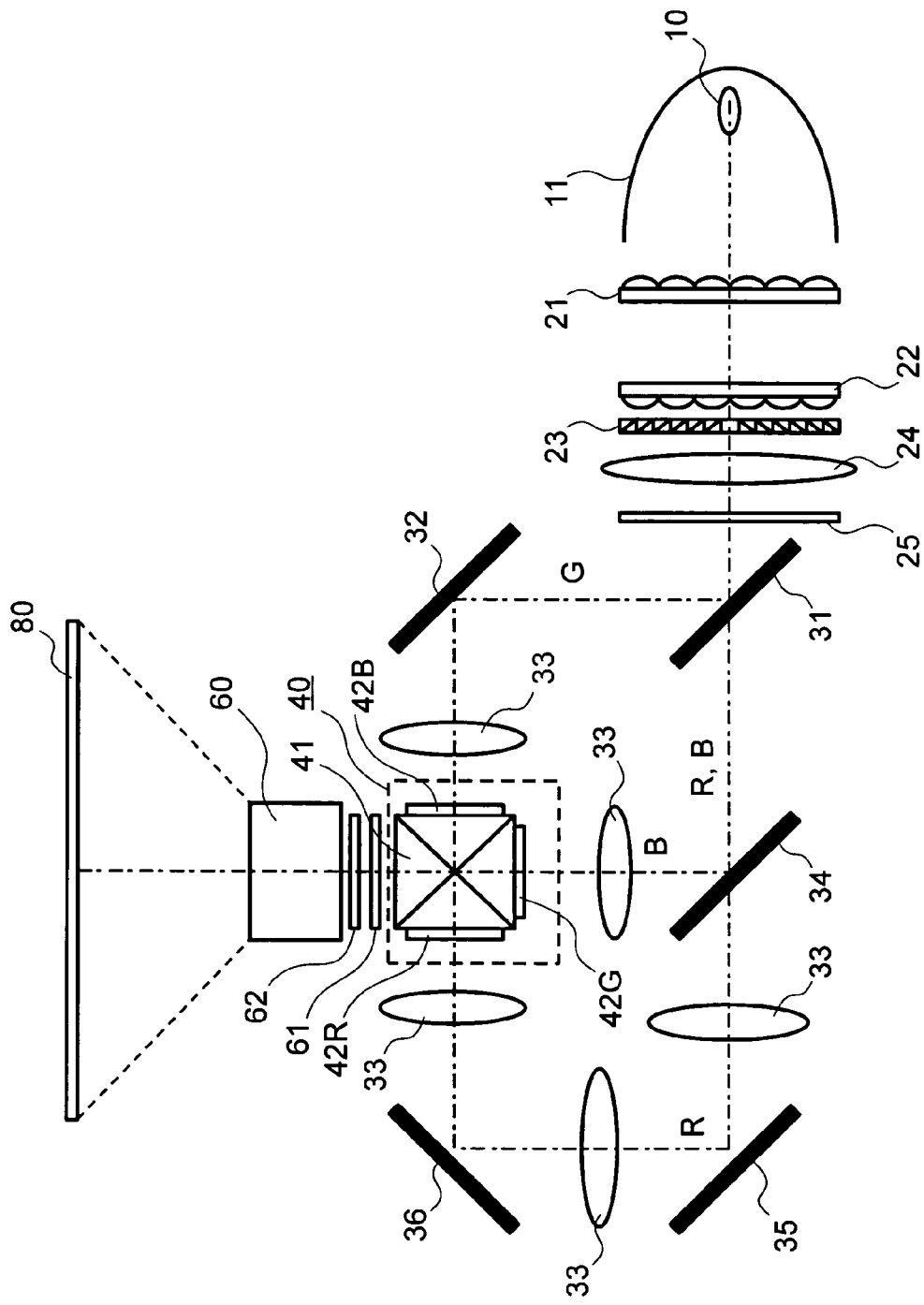
FIG. 1 is a block diagram for showing the entire structures of a projection-type image display apparatus, which applies transparent-type liquid crystal elements (or panels) therein, according to an embodiment 1 of the present invention.

First of all, FIG. 1 attached herewith shows the entire structures of a projection-type image display apparatus according to an embodiment 1, in particular, applying transparent-type liquid crystal image display elements (or panels) therein, as those for modulating light strength or intensity of three color lights, i.e., R, G and B lights, within an optic unit.

In the figure, a light source 10 is made up with a white color lamp, i.e., so-called a high-pressure lamp, such as, the metal halide lamp or the high-pressure mercury lamp or the like, as was mentioned above, for example, or alternately a xenon lamp, a mercury-xenon lamp, or a halogen lamp, etc. Further, a reference numeral 11 in the figure depicts a concave mirror (i.e., a reflector) having a reflection surface of an ellipsoidal surface or a parabolic surface, which is attached around that lamp, and it emits the light (i.e., white light) irradiated from the lamp into one (1) direction.

Next, the light emitting from this light source 10, penetrating through a pair of multi-lenses 21 and 22 disposed on an optical axis thereof (however, each multi-lens is made up with a large number lens cells, which are aligned in matrix-like), comes to be a white light having a uniform light strength within an irradiation surface area, and further it is incident upon a polarized-light conversion element 23, which is constructed with lines of rhombic or diamond-shaped prisms, each having about a half (½) size of the lens width, which are disposes to be fitting to a pitch of the vertical direction on the each optical axis of the lenses. Upon the polarized-light conversion element 23, a polarized light separation film is provided on a prism surface thereof, and therefore the incident light thereon is divided or separated into a P-polarized light and a S-polarized light through that polarized light separation film. The P-polarized light penetrates through the polarized light separation film as it is, to be emitted outside. On the other hand, after being reflected upon the polarized light separation film and further being reflected again into the direction of the inherent optical axis within the diamond-shaped prisms neighboring to each other, the S-polarized light is rotated in the polarization direction by 90° through a $\lambda/2$ phase difference plate, which is provided on an emission surface of the prism. Thus, it is converted into the P-polarized light and is emitted from. In this manner, only the P-polarized light is emitted from the polarized-light conversion element 23.

The P-polarized light from the polarized-light conversion element 23 is further condensed by a collimator lens 24, which has a positive refractive power and equipped with a condensing function, and is incident upon an optic system, which will be explained below, through a filter 25, for example.

Thus, the P-polarized light incident thereupon, after being separated G-color light therefrom through a R- and B-lights penetrating and G-light reflecting dichroic mirror 31, i.e., the G-light separated therefrom is further reflected upon a first white color reflection mirror 32, to be incident upon an image display element portion which will be explained in details thereof later, through a collimator lens 33. On the other hand, the R-light and the B-light penetrating through the dichroic mirror 31 mentioned above, next after being color-separated the B-light by a R-light penetrating and B-light reflecting dichroic mirror 34, i.e., the B-light separated therefrom is incident upon the image display element portion through a collimator lens 33. Lastly, the R-light penetrating through a dichroic mirror 34, after penetrating through the collimator lens 33, is reflected upon a white light reflection mirror 35, and further after penetrating through another collimator lens and reflected upon a third white light reflection mirror 36, it is incident upon the image display element portion through a collimator lens 33. In this manner, the P-polarized light from the light source mentioned above is separated into the R-light, the B-light and the G-light, respectively, with using the polarization thereof, and they reach to the image display element portion which will be mentioned in details thereof below.

Figure 2:
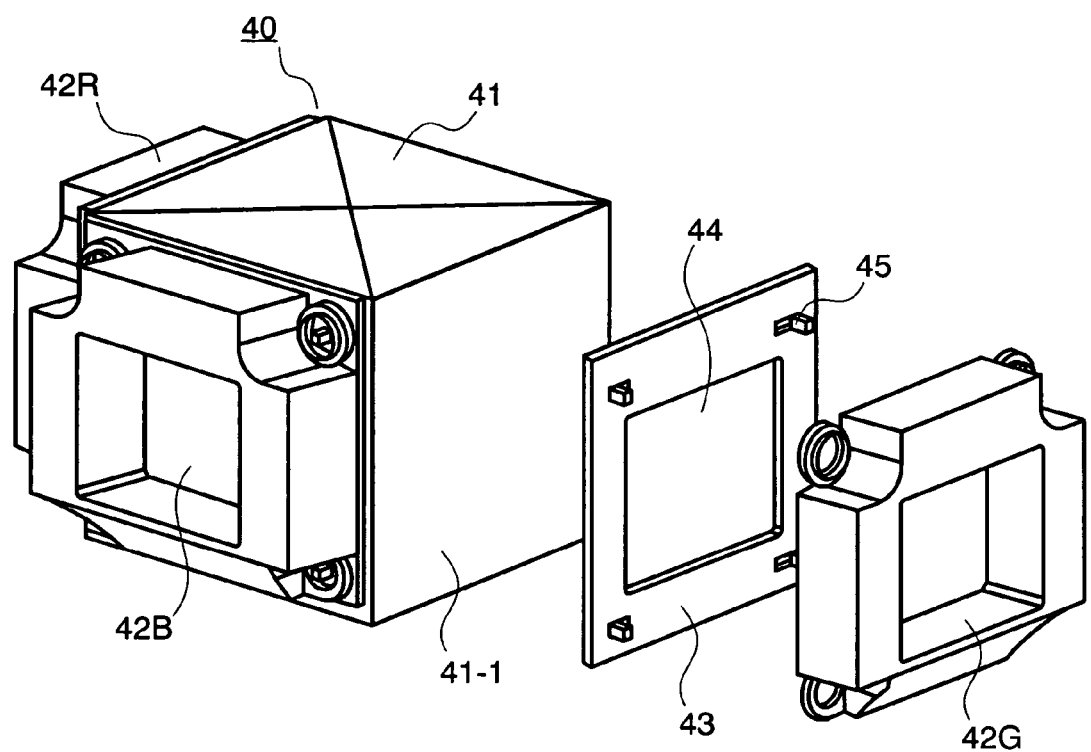
FIG. 2 is a partially exploded perspective view for showing the detailed structures of a cross dichroic prisms, as being an optical synthesizing means, and the transparent-type liquid crystal elements for use of R, G and B color lights, in the projection-type image display apparatus mentioned above.

However, the image display element portion 40 mentioned above comprises an optical synthesizing means being cubic-like in the external configuration thereof, which is made up with four (4) pieces of triangular prisms, i.e., so-called cross dicroic prisms 41. And, upon the incident surfaces of the cross dicroic prisms 41, each separating from one another (but, only one (1) surface 41-1 is shown in the figure), as is shown in FIG. 2 attached herewith, are attached a R-light penetration type image display element 42R, a G-light penetration type image display element 42G, and a B-light penetration type image display element 42B, respectively, in one body (or, as a unit), through jigs 43 for fixing, each providing an opening 44 at a central portion of a metal plate and also projections 45 formed through cutting at every corners thereof. Further, those of the R-light penetration type image display element 42R, the G-light penetration type image display element 42G, and the B-light penetration type image display element 42B are fixed on the fixing jigs 43, respectively, through a solder or an adhesive, for example, and they are positioned and fixed at the predetermined potions with respect to three (3) incident surfaces, at high accuracy thereof, so as to synthesize the lights from the light source, penetrating therethrough while being modulated the intensity thereof, respectively.

Figure 3:
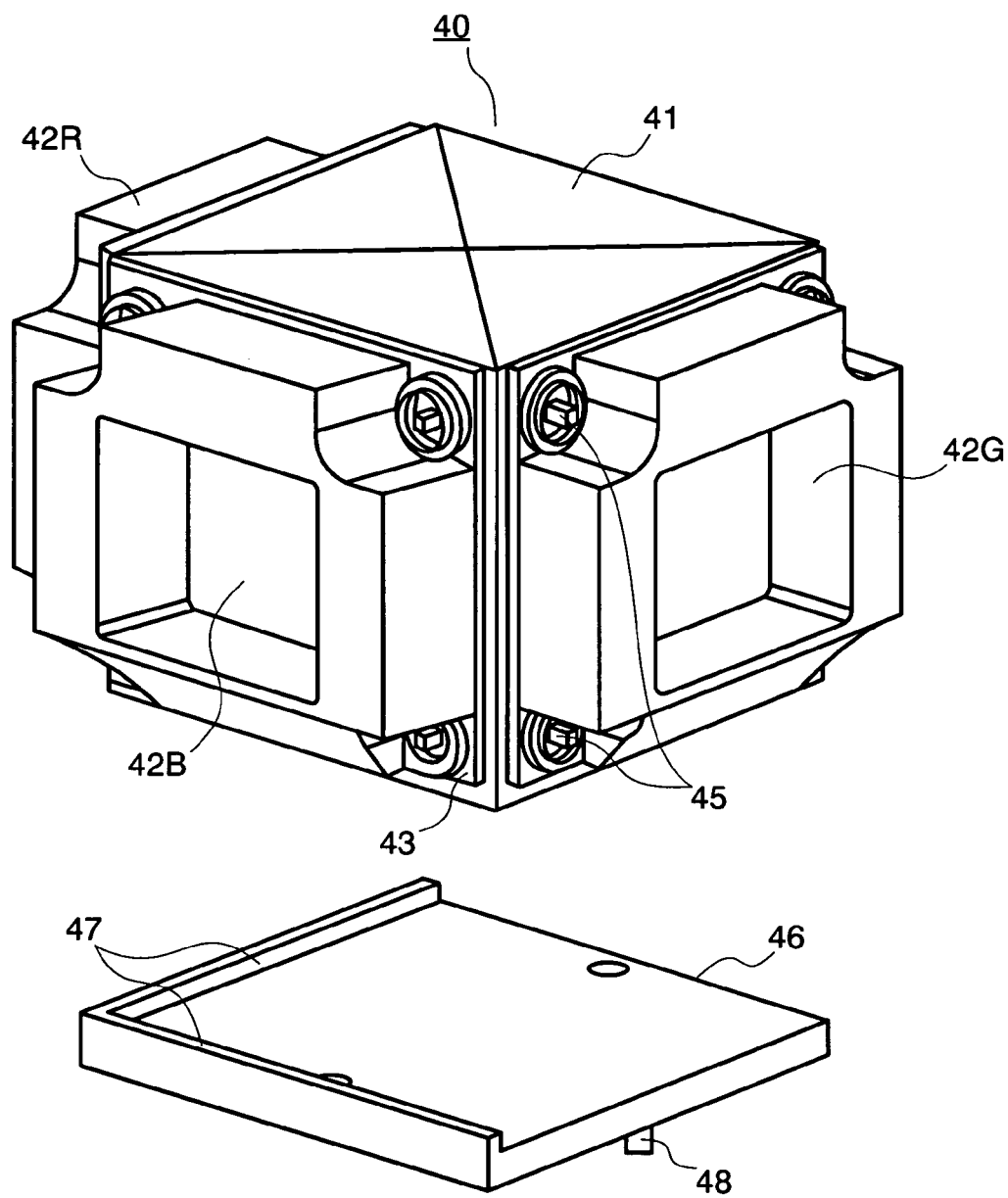
FIG. 3 is also a partially exploded perspective view for showing the detailed structures of the cross dichroic prisms, as being the optical synthesizing means, and the transparent-type liquid crystal elements for use of R, G and B color lights, in the projection-type image display apparatus mentioned above.
Figure 4:
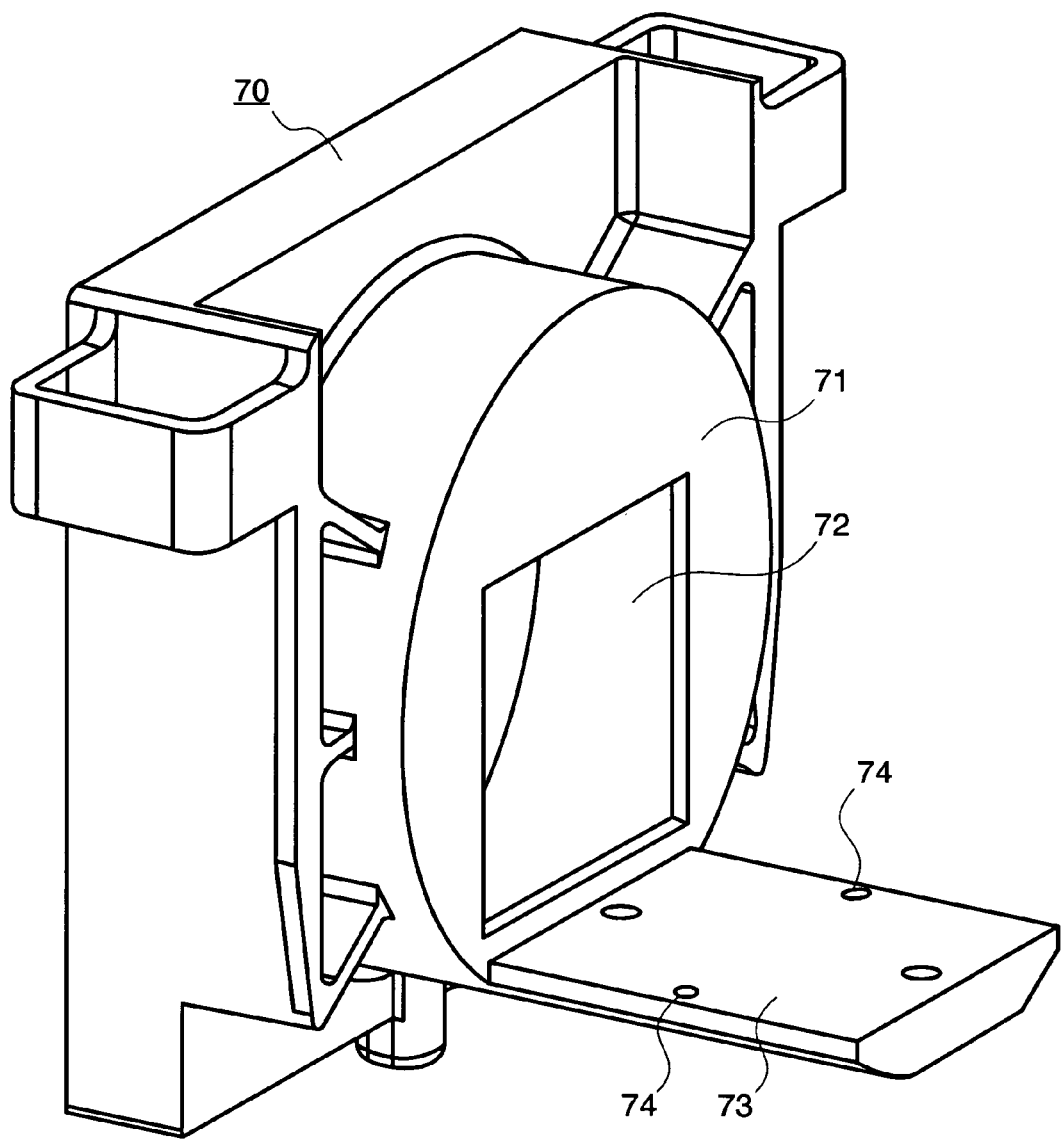
FIG. 4 is a partially enlarged perspective view for showing the details of the cross dichroic prisms mentioned above.

Further, as is shown in FIG. 3 attached herewith, on lower surfaces of cross dichroic prisms 41, being attached with the R-light penetration type image display element 42R, the G-light penetration type image display element 42G, and the B-light penetration type image display element 42B thereon, there is also attached a seat portion 46, having a shape being almost similar to the cross-section of the prisms 41 mentioned above, in one (1) body through ah adhesive, for example. Further, on two (2) sides of this almost square-shaped seat portion 46, neighboring to each other, are formed projection portions (or frames) 47 and 47 for use of positioning, crossing on each other. With this, it is possible to fix the seat portion 46 at the desired position on the lower surfaces of the cross dichroic prisms 41, correctly, but only by mounting the lower surfaces of the prisms 41 on the seat portion 46 and abutting it onto the projection frames 47 and 47, simply. Further, on the lower side surface of this seat portion 46 are formed a plural number of projections 48 for use of positioning (two (2) pieces in this example), in advance, correctly and at high accuracy, at a predetermined position, as will be explained later, so that it can be positioned and fixed, easily, onto the attachment structures formed on the side of the projection lens 60.

Again, turning back to FIG. 1 mentioned above, after being modulated in the intensity thereof through the respective penetration-type image display elements, within the image display element portion 40 which was explained in the above, the lights synthesized within the cross dichroic prisms 41, as being the color synthesizing means, is enlarged and projected onto a screen 80, for example, through a projection lens, the details of which will be explained below. However, this image display element portion 40 has such the structures of being detachable opposing to the incident surface of the projection lens 60. Further, reference numerals 61 and 62 in the figure depict a reflection-type polarizing plate and an absorption-type polarizing plate, which are provided on the incident side surface of the projection lens 60.

Following to the above, by referring to FIGS. 4 to 8 attached herewith, there is shown an example of the structures (i.e., a supporting portion) for enabling the image display element portion 40 to be detachable on the incident side surface of the projection lens 60. As apparent from those figures, on the incident side surface of the projection lens 60 is provided so-called an attachment portion 70 for the image display element, for attaching the image display element portion 40 thereon, in a detachable manner. However, as is also apparent from FIG. 4, this image display element attachment portion 70 is formed into a predetermined shape, such as, through the injection molding of plastic or the like, for example. With the present example, it is almost square in the external configuration thereof, and further it is formed into such a shape that it has a projection portion 71 at around a central portion thereof, i.e., on a surface opposing to the incident surface of the projection lens 60.

And, on this projection portion 71 is formed a square shaped portion 72, being opened therein, with fitting to an exit surface of the cross dichroic prisms 41 mentioned above (i.e., the surface of the cross dichroic prisms 41, but differing from those mounding the R-light penetration type image display element 42R, the G-light penetration type image display element 42G, and the B-light penetration type image display element 42B thereon). And, further below that opening portion 72 is formed so-called a tongue-like fixing portion 73 in one body (or as a unit), for attaching the image display element portion 40, i.e., the cross dichroic prisms on an upper surface thereof, detachably. And, on the upper surface of this tongue-like portion 73 are formed holes 74 and 74, into which the projections 48 for use of positioning shown in FIG. 3 mentioned above are inserted to be fitted, at predetermined positions thereof, correctly and with high accuracy.

Figure 5:
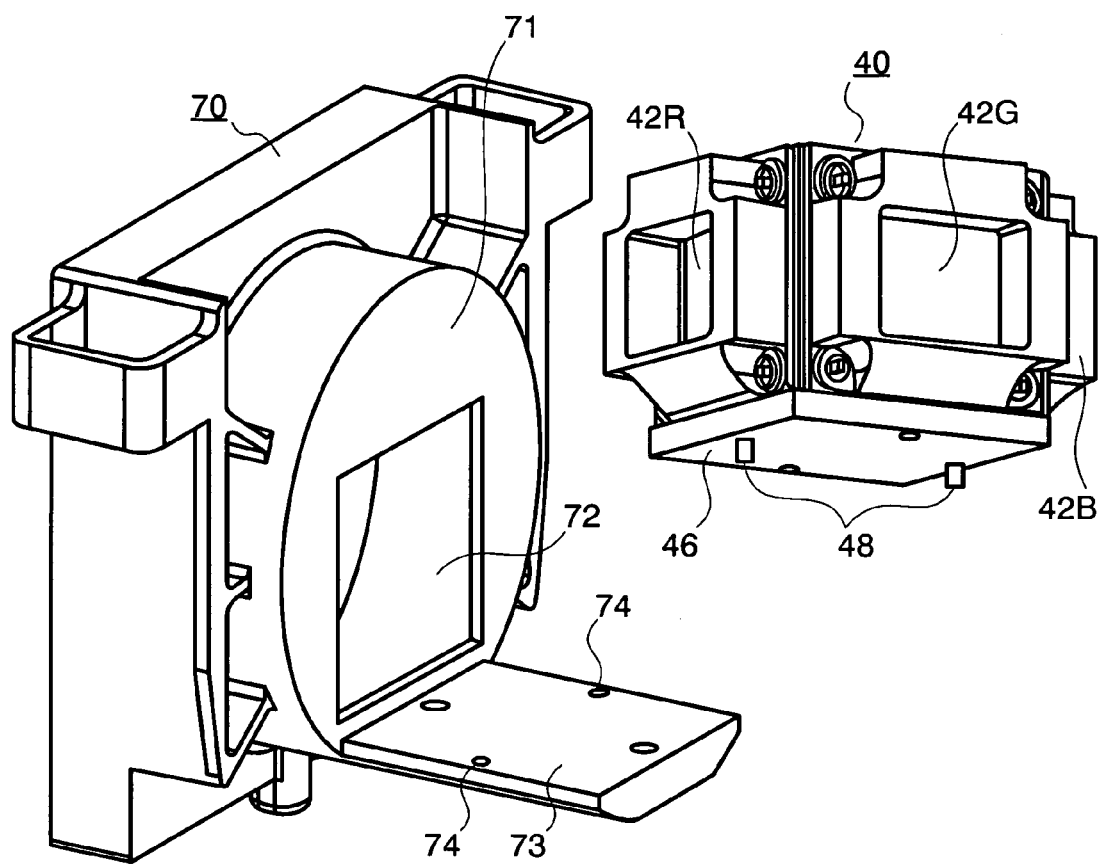
FIG. 5 is a partially enlarged perspective view for showing the condition when installing the cross dichroic prisms, on which are attached the transparent-type liquid crystal elements for use of R, G and B color lights, onto an attachment structure.
Figure 6:
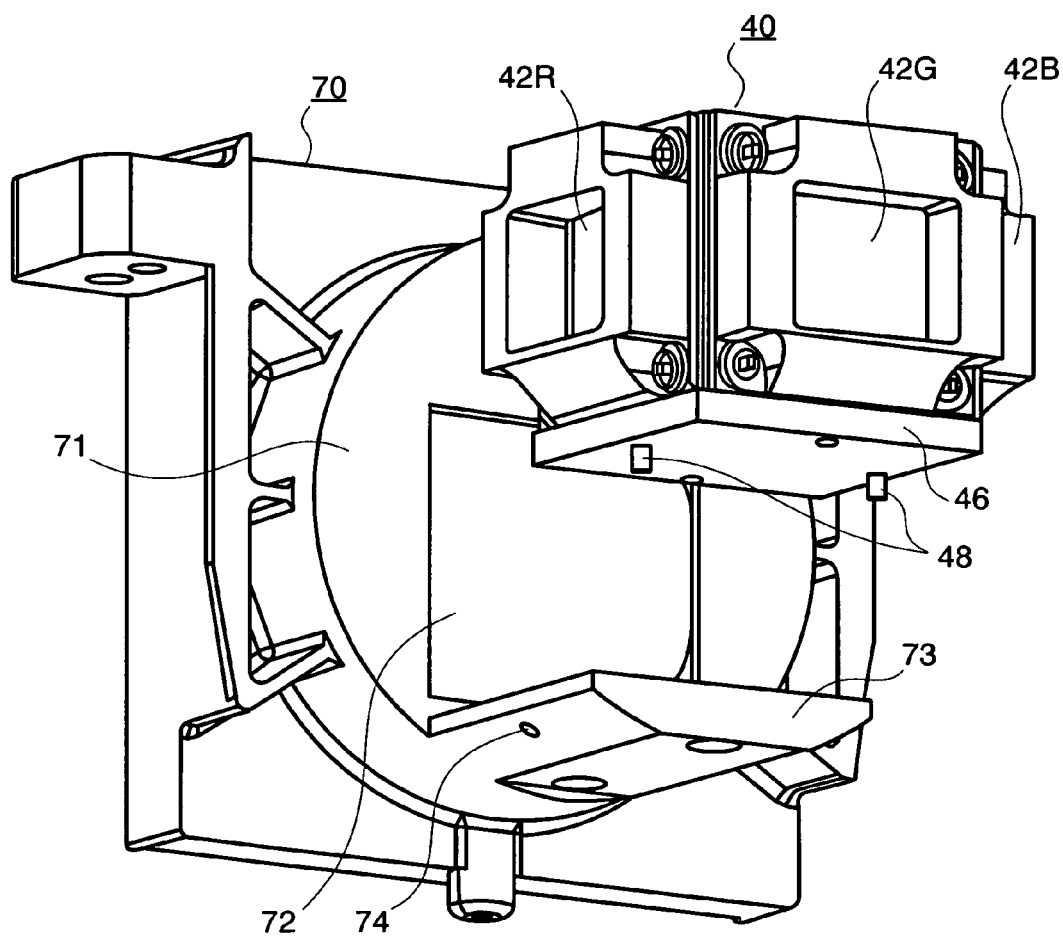
FIG. 6 is also a partially enlarged perspective view for showing the condition when installing the cross dichroic prisms, on which are attached the transparent-type liquid crystal elements for use of R, G and B color lights, onto the attachment structure.
Figure 7:
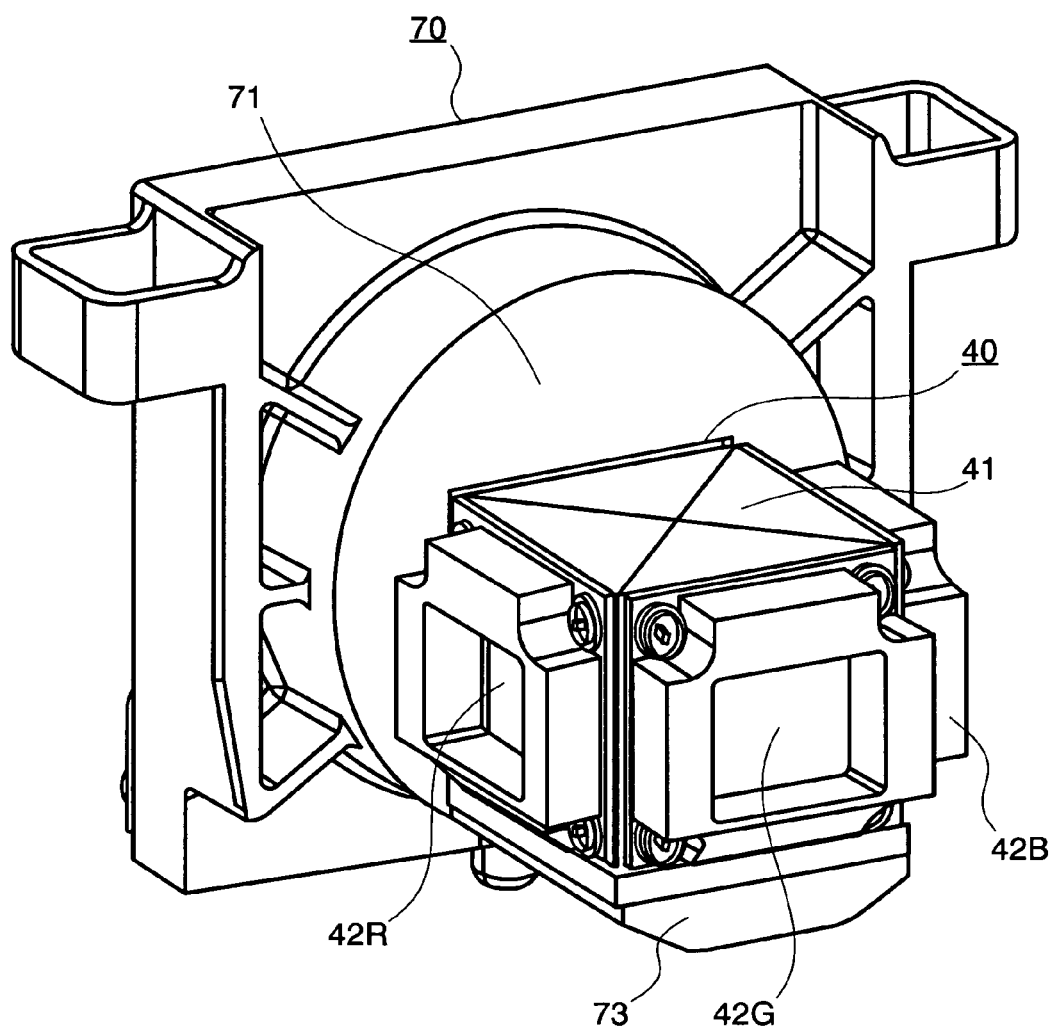
FIG. 7 is a partially enlarged perspective view for showing the condition after installing the cross dichroic prisms, on which are attached the transparent-type liquid crystal elements for use of R, G and B color lights, onto the attachment structure.
Figure 8:
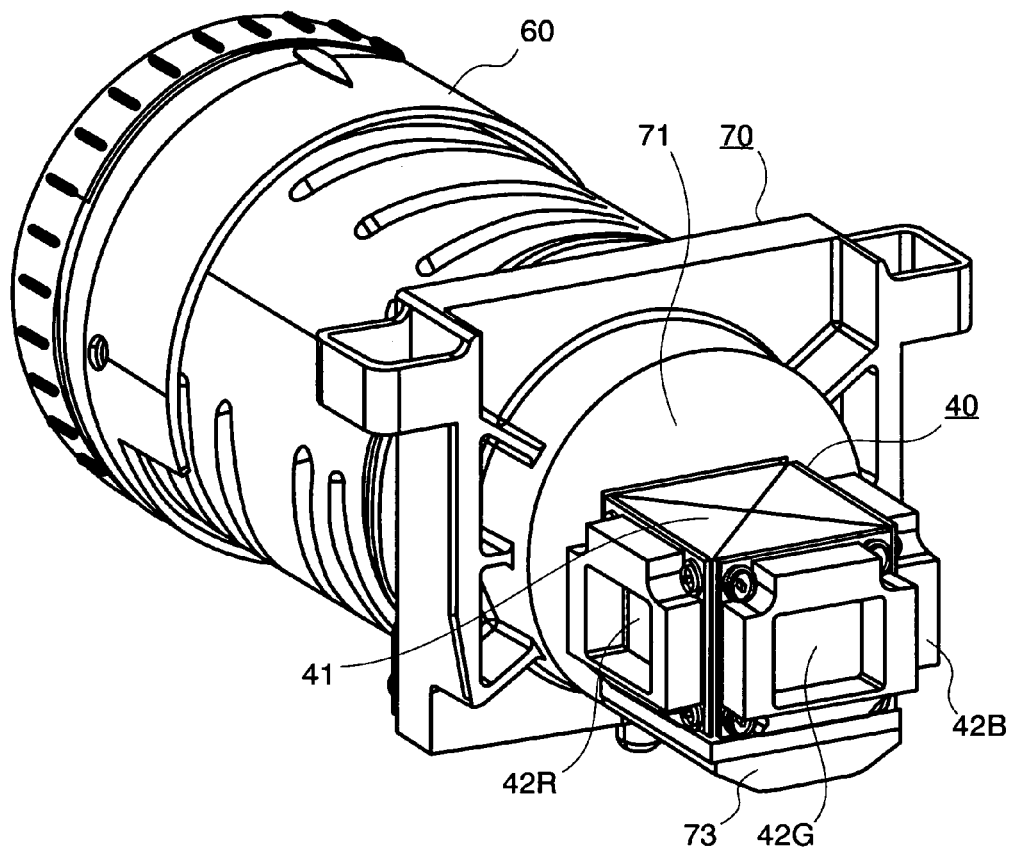
FIG. 8 is a perspective view of the projection lens after being installed with the cross dichroic prisms, on which are attached the transparent-type liquid crystal elements for use of R, G and B color lights, onto the attachment structure.

In FIGS. 5 and 6 attached herewith is shown the condition where the image display element portion 40, the detailed structures of which are explained in the above, is mounted on the attachment portion 70 for the image display element, which is attached on the incident side surface of the projection lens 60. Also, in FIG. 7 attached herewith is shown the condition after mounting the image display element portion 40 on the attachment portion 70 for the image display element, and further, in FIG. 8 attached herewith the condition after mounting the image display element portion 40 on the incident side surface of the projection lens 60, respectively.

As was mentioned above, in the projection-type image display apparatus according to the embodiment 1, in particular, applying the penetration-type liquid crystal image display elements (panels) as those for modulating the light intensities of the three (3) color lights, R, G and B lights, with adopting the structures for enabling to amount the image display element portion 40, which is built up with attaching the R-light penetration type image display element 42R, the G-light penetration type image display element 42G, and the B-light penetration type image display element 42B upon the three (3) surfaces of the cross dichroic prisms, neighboring to one another, onto the image display element attachment portion 70 attached on the incident side surface of the projection lens 60, in particular, with applying the tongue-like fixing portion 73, and further the positioning projections 48 and the fitting holes 74 thereof, easily, at the correct position, in detachable manner, it is possible to exchange only the image display element portion 40, easily.

Thus, with the projection-type image display apparatus according to the embodiment 1, though the heat generation also comes up to be large more and more on the liquid crystal panels, due to irradiation of the stronger light irradiated from the light radiation source upon a small area of the liquid crystal panel, accompanying with the remarkable improvement for achieving the high definition and the high brightness, however according to the present invention, being accomplished by taking the fact into the consideration thereof, that it is difficult at all to suppress the heat generation mentioned above on the liquid crystal panel only by the introduction and the circulation of the cooling air into the inside of the apparatus by means of the conventional air-cooling fan, while also on the other hand being achieved by paying attention onto the liquid crystal image display elements (the panels), on which improvement is made remarkably for achieving the low-costs and the small-sizing thereof in recent years, it is to bring the optic unit being inescapable or unavoidable from deterioration thereof due to the heat generation mentioned above, in particular, the image display element portion made up with the cross dichroic prisms equipped with the liquid crystal image display elements (i.e., the panels), to be exchangeable with a new image display element portion, with easy or simple work, depending on necessity thereof, accompanying with the deterioration thereof, and thereby enabling to obtain the desired optical performance, always therefrom.

Also, within the projection-type image display apparatus according to the embodiment 1, it is preferable to provide a supporting portion for mounting the cross dichroic prisms thereon, on which the display elements are attached, in a freely detachable manner, in particular, on the incident surface side of the projection lens, or to fix a member for positioning on a surface of the cross dichroic prisms where no display element is attached, to be attached onto that supporting portion, which is provided on the incident surface side of the projection lens. And, it is also preferable to put a member for preventing the reflection between the incident surface side of the projection lens and the projection lens.

In more details thereof, as is apparent from the above-mentioned, in the manufacturing processes thereof, it is possible to fix the image display element portion 40 at the correct position on that seat portion 46, which is built up with the R-light penetration type image display element 42R, the G-light penetration type image display element 42G, and the B-light penetration type image display element 42B, being attached at high accuracy on the three (3) pieces of surfaces of the cross dichroic prisms 41, neighboring to one another, but only through fixing it while abutting onto the positioning projection frames 47 and 47 on that seat portion 46. Then, with a simple work, i.e., inserting the positioning projections 48 formed on the lower surface of that seat portion 46 into the fitting holes 74, which are formed on a surface of the tongue-like fixing portion 73 of the image display element attachment portion 70, it is possible to position that image display element portion 40, again, correctly, with respect to the optic system of the projection-type image display apparatus mentioned above, in particular, on the light paths of R-light, G-light and B-light thereof.

Also, the reflection-type polarizing plate 61 and the absorption-type polarizing plate 62 are disposed on the incident surface side of the projection lens 60 (i.e., between the projection lens 60 and the cross dichroic prisms 41), according to the embodiment 1 mentioned above, and thereby building up the structures for absorbing the reflection of incident light upon the projection lens 60. With such the structures, it is possible to obtain the projection-type image display apparatus prohibiting to generate a ghost or the like due to the reflection light, for example, i.e., being more superior in the optical performances thereof. Further in more details thereof, it is preferable to set a degree of polarization of the main reflection-type polarizing plate 61 to be larger than that of the absorption-type polarizing plate 62, since it is possible to absorb the reflection light upon the projection lens much more therewith. However, those reflection-type polarizing plate 61 and absorption-type polarizing plate 62 are separated from the image display element portion 40, i.e., they are not detachable in the structures thereof.

Figure 9:
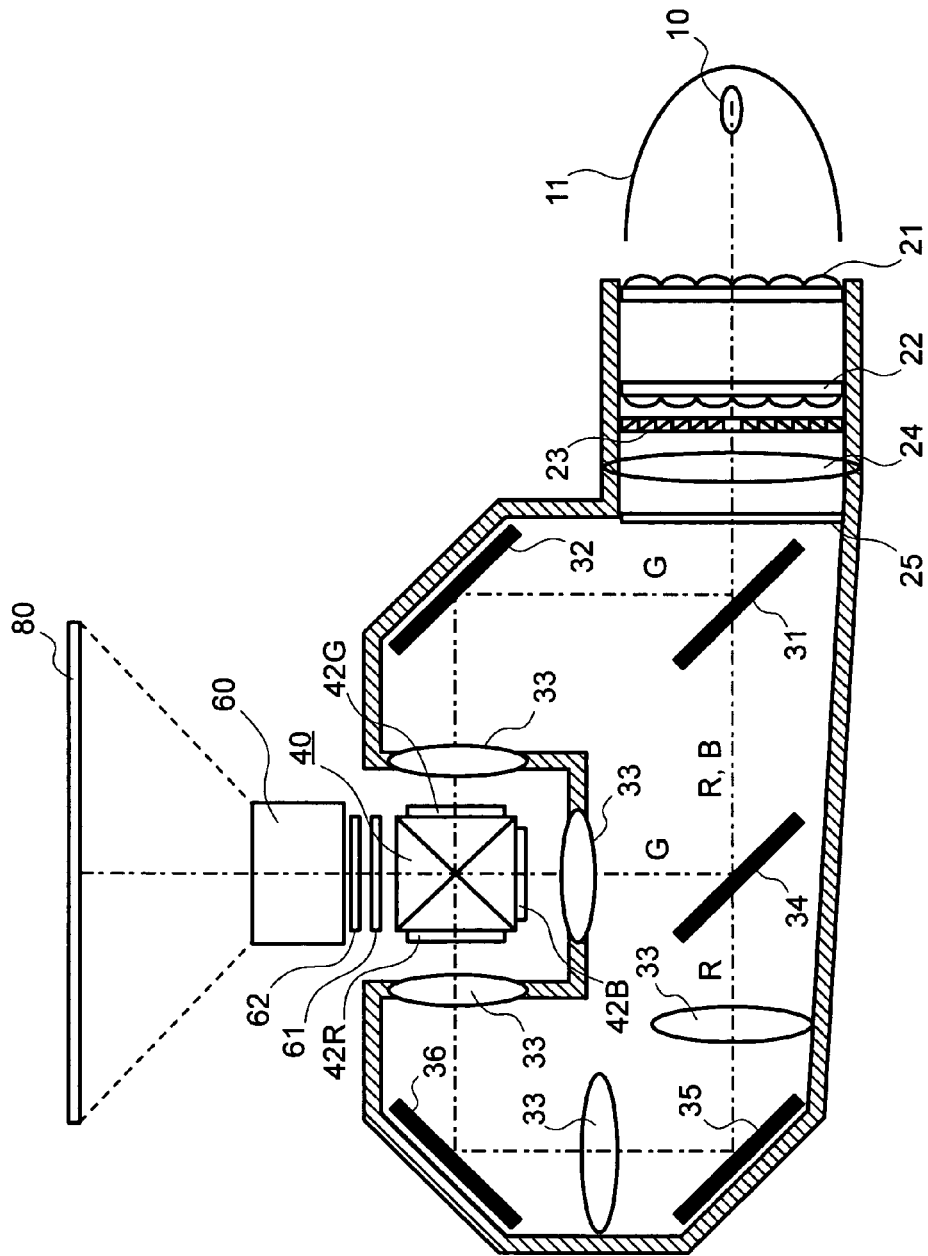
FIG. 9 is a block diagram for showing the entire structures of a projection-type image display apparatus, according to an embodiment 2 of the present invention.

FIG. 9 attached herewith shows the projection-type image display apparatus, according to an embodiment 2. As is apparent from the figure, in particular, according to this embodiment 2, it is so constructed that the optical paths within the inside thereof can be protected from dusts, which are introduced from an outside of the apparatus, by disposing the optic system, i.e., for separating the lights emitting from the light source 10 into the colors thereof, and thereby entering them upon the three (3) pieces of surfaces of the cross dichroic prisms 41 building up the image display element portion 40 neighboring to one another, i.e., the R-light penetration type image display element 42R, the G-light penetration type image display element 42G, and the B-light penetration type image display element 42B, within an inside of a dustproof housing 90 made of a plastic, for example.

In more details thereof, as is apparent from the figure, the pair of the multi-lenses 21 and 22, the polarized-light conversion element 23, the collimator lens 24 and the filter 25, further the R- and B-lights penetrating and G-light reflecting dichroic mirror 31, the first white color reflection mirror 32 and the collimator lens 33, further the R-light penetrating and B-light reflecting dichroic mirror 34 and the collimator 33, and further the second white light reflection mirror 35, the collimator lens 33, the third white light reflection mirror 36, and the collimator lens 33 are sealed within the housing 90 made of a plastic, air-tightly.

With the embodiment 2, the details of which was explained in the above, there was mentioned only the case of applying the penetration-type liquid crystal image display elements (i.e., the panels), in particular, to be the liquid crystal image display elements (i.e., the panels) for modulating the light intensities of the three (3) color lights, i.e., the R-light, G-light and B-light, within the optic unit thereof; however, it would be apparent that the present invention should not be restricted only to such the penetration-type liquid crystal image display elements (i.e., the panels), but is also applicable into the projection-type image display apparatus adopting the refection-type liquid crystal image display elements (i.e., the panels), for example, in the place thereof.

Figure 10:
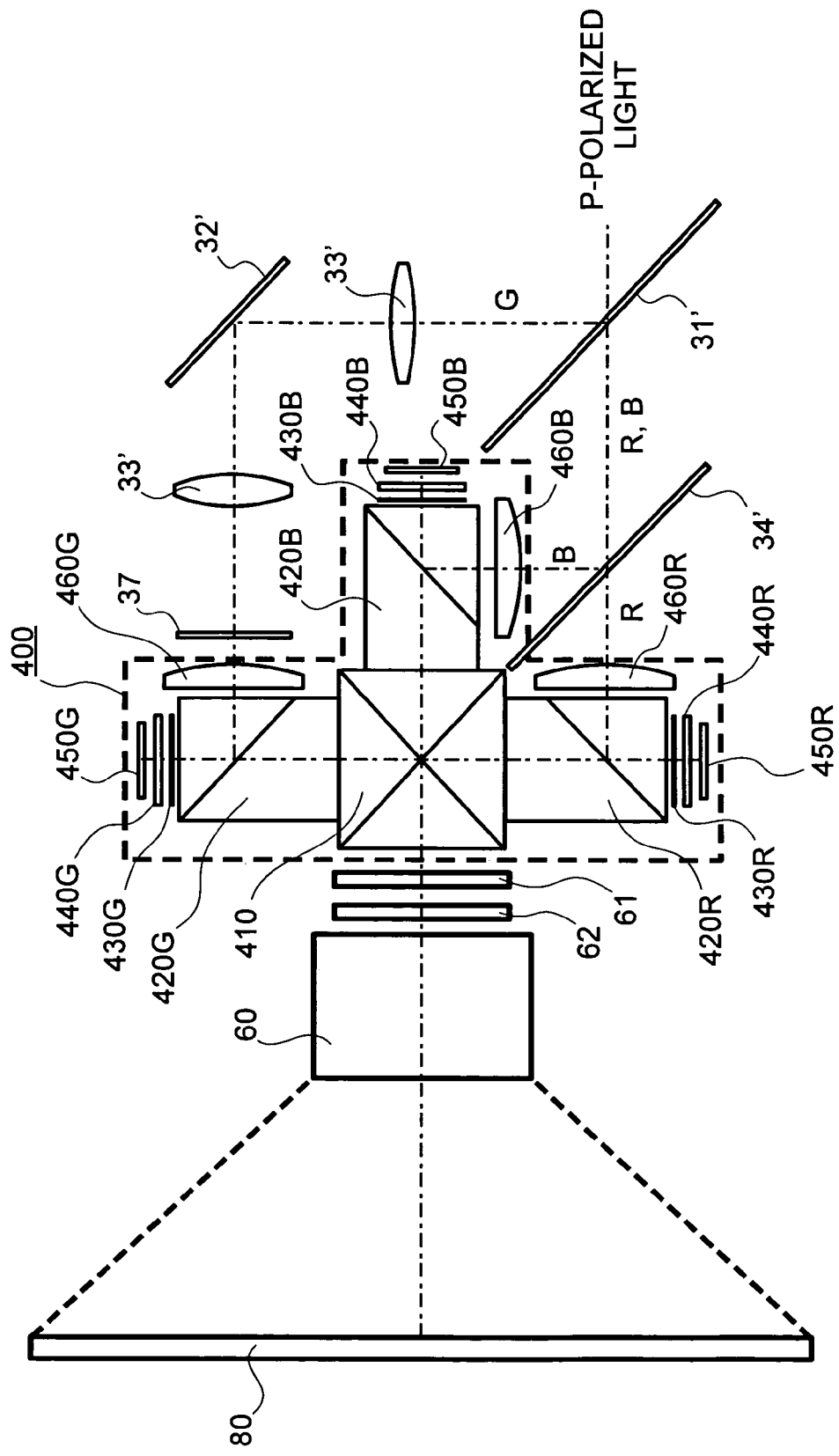
FIG. 10 is a block diagram for showing the entire structures of a projection-type image display apparatus, applying reflection-type image display elements therein, according to an embodiment 3 of the present invention.
Figure 11:
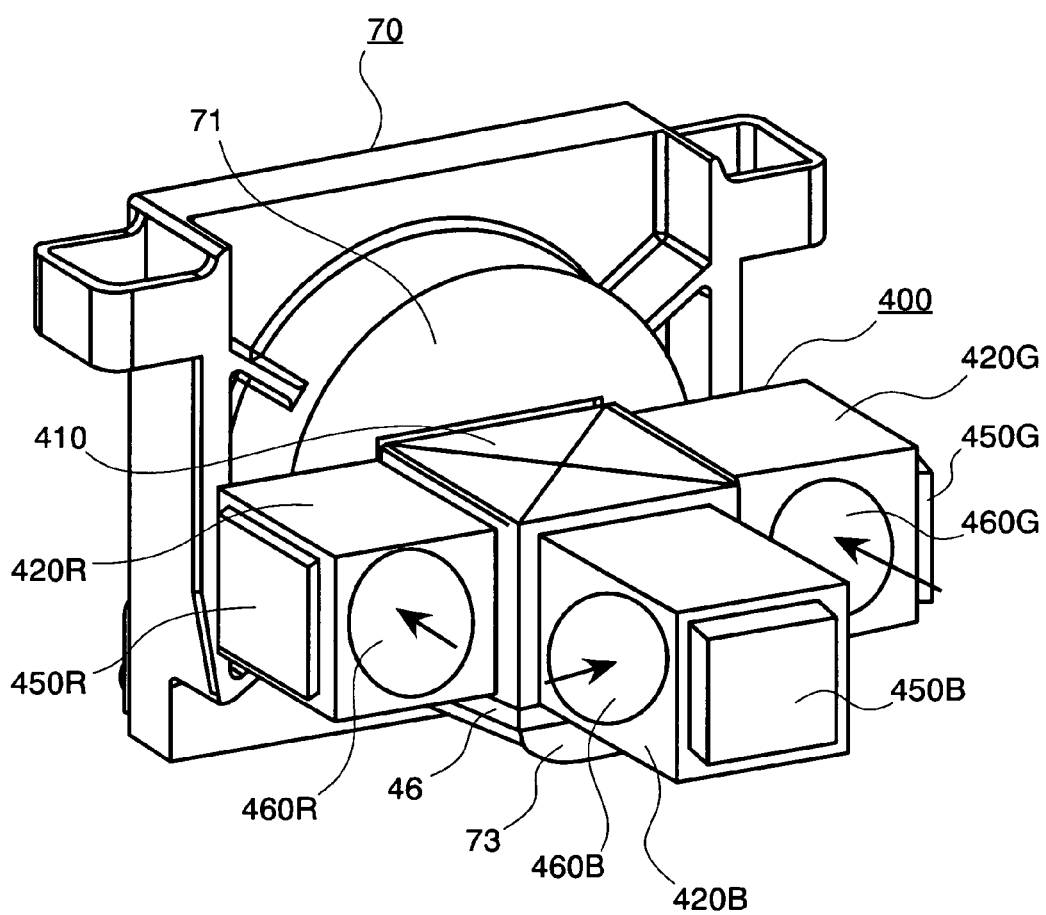
FIG. 11 is a partially enlarged perspective view for showing the details of the structures for installing the optical synthesizing means, including the cross dichroic prisms, thereon in the projection-type image display apparatus according to the embodiment 3.

FIGS. 10 and 11 attached herewith show the structures, mainly around a reflection polarized-light prism, including cross dichroic prisms 410 and the liquid crystal image display elements (i.e., the panels) attached on the three (3) neighboring surfaces thereof, in particular, being constructed to be detachable onto the apparatus, in case of applying reflection type liquid crystal image display elements (i.e., panels), according to an embodiment 3.

First, FIG. 10 shows the structures of the projection-type image display apparatus applying such reflection-type liquid crystal image display elements (i.e., the panels) as was mentioned therein, wherein the P-polarized light emitted from the light source similar to that mentioned above, after being separated in the color into thereof G-light upon a R- and B-lights penetrating and G-light reflecting dichroic mirror 31', and in particular, the G-light separated, it is reflected upon a first white color reflection mirror 32' through a collimator lens 33', and after being incident upon a correction polarization plate 37 through that collimator 33', again, is incident upon an image display element portion 400 having a reflection-type polarization prism therein. On the other hand, R-light and B-light penetrating through the dichroic mirror 31' are separated in the color thereof, next, upon a R-light penetrating and B-light reflecting dichroic mirror 34', and thereafter the B-light separated is incident upon the image display element portion 400. Finally, the R-light penetrating through the dichroic mirror 34' is also incident upon the image display element portion 400, in the similar manner.

However, as is apparent from the figure, this image display element portion 400 comprises cross dichroic prisms 410, i.e., a light synthesizing means being cube-like in the outer configuration thereof, and combining four (4) pieces of triangular prisms with, and onto the three (3) pieces of surfaces thereof, neighboring to one another, are connected or bonded a R-light reflection-type image display prism 420R, a G-light reflection-type image display prism 420G, and a B-light reflection-type image display prism 420B, respectively, so as to build up necessary light paths. And, upon surfaces of those reflection-type image display prisms 420 opposing to the bonding surfaces thereof are attached a reflection-type G-light liquid crystal image display element (i.e., panel) 450G, a reflection-type B-light liquid crystal image display element (i.e., panel) 450B, and a reflection-type R-light liquid crystal image display element (i.e., panel) 450R, respectively, through an analyzer 430 and a ½ wavelength plate 440 each. Further, a reference numeral 460 in the figure depicts convex lenses, which are attached on side surfaces of the reflection-type image display prisms 420, for the purpose of introducing the R-, G- and B-lights therein, respectively. Also, it is possible to build up the optical paths necessary, by using reflection-type of polarized-light mirrors, not shown in the figure, but in the place of the reflection-type image display prisms 420.

Within the projection-type image display apparatus applying the reflection-type liquid crystal image display elements (i.e., the panels) having such the structures therein, but similar to those shown in the embodiments 1 and 2, the optic image is formed through the cross dichroic prisms 410, functioning as being the color synthesizing means after modulating the light intensities of the lights through the R-, G- and B-lights reflection-type image display prisms 420 mentioned above, and it is projected onto the screen 80 or the like, through the projection lens 60.

Next, FIG. 11 shows the image display element portion 400, the detailed structures of which was explained in the above, and in particular, the structures for attaching or mounting the cross dichroic prisms 410, including the reflection-type image display prisms 420. However, in this embodiment, also in the similar manner to that shown in FIG. 3 mentioned above, a bottom surface of the cross dichroic prisms 410 is fixed onto an upper surface of the seat portion 46 mentioned above, with using the positioning projection frames 47 and 47 formed thereupon. And, the positioning projections 48 formed on the lower surface of that seat portion 46 into the fitting holes 74, which are formed in advance on the surface of the tongue-like fixing portion 73 of the image display element attachment portion 70, are also inserted into the fitting holes 74 and 74, which are formed on the surface of the tongue-like fixing portion 73 of the image display element attachment portion 70, the details of which were explained in FIG. 4 mentioned above, and thereby enabling this image display element portion 400 to be attached or mounted at the correct position, simply or easily, in a detachable manner.

As was mentioned above, also with the projection-type image display apparatus applying therein the liquid crystal image display elements (i.e., panels) 450 explained in the above, in the similar manner, the optic unit, inescapable from the deterioration thereof accompanying with the remarkable advances in the high definition and the high brightness in recent years, can be built up with the reflection-type image display elements (i.e., the panels), depending on the necessity thereof, i.e., the cross dichroic prisms 410, including the reflection-type polarization prisms 420, etc., can be formed in one body (as a unit), to be exchangeable with a new image display element portion through simple works, thereby enabling it to exhibit or keep the desired optical performances thereof, always.

In more details, as is similar to that mentioned above, in the manufacturing processes thereof, it is also possible to position the image display element portion 400, again, correctly on the light paths of R-light, G-light and B-light, only by fixing the image display element portion 400 at the correct position on that seat portion 46, which is built up with the cross dichroic prisms 410 and also the R-, G- and B-light reflection-type polarization prisms 420 attached on the three (3) surfaces thereof neighboring to one another, and also inserting this into the fixing holes 74 which are disposed and formed correctly on the surface of the tongue-like fixing portion 73 of the image display element attachment portion 70.

In addition thereto, according to the embodiment 3, it is also possible to achieve the projection-type image display apparatus being more superior in the optical performances thereof, i.e., prohibiting to generate a ghost or the like due to the reflection light, for example, with disposing the reflection-type polarizing plate 61 and the absorption-type polarizing plate 62 on the incident surface side of the projection lens 60 (i.e., between the projection lens 60 and the cross dichroic prisms 410). Also, in the similar manner to that of FIG. 9 mentioned above, it is also possible to obtain the structures for protecting the optical paths within the inside thereof, while disposing the optic system, which guides the lights incident upon the three (3) pieces of surfaces of the image display element portion 400 neighboring to one another, within the housing 90 made of a plastic, for example.

In the projection-type image display apparatus according to the embodiment 3, it is preferable to provide the supporting portion on the incident surface side of the projection lens, for attaching or mounting the cross dichroic prisms thereon in detachable manner, each of which is attached with the display element. And, it is also preferable to fix the member for positioning on the surface of the cross dichroic prisms where no display element is attached, to be attached onto the supporting portion, which is provided on the incident surface side of the projection lens. Further, for each of the cross dichroic prisms, it is preferable to comprise the reflection-type polarizing prism, which is fixed on the surfaces neighboring to each other, and it is also preferable that the R-, G- and B-light reflection-type image display elements are attached on different surfaces of the reflection-type polarizing prisms. In addition thereto, it is also preferable to put a member for antireflection between the exit side of the cross dichroic prisms and the projection lens.

In those embodiments 1 to 3, although the explanation was given on an assumption that the P-polarized lights can be obtained from the illumination system (i.e., the light source 10 mentioned above); however they should not be restricted only to that. For example, it may be so constructed that only S-polarized lights can be emitted from, in the place thereof. However, in more details thereof, in case where the lights emitted from the light source 10 building up the illumination system are the S-polarized lights, those lights are reflected upon the reflection-type polarization prisms 420, functioning as being the polarized-light conversion devices, and they are converted into the P-polarized lights in conformity with image signals through the reflection-type liquid crystal image display elements (i.e., panels) 450G, 450B and 450R, to be incident upon the cross dichroic prisms (i.e., the color synthesizing device) 410. In this instance, by taking the characteristics of the prisms mentioned above into the consideration thereof, in particular, with provision of a $\lambda/2$ plate between the polarized-light conversion devices (i.e., the reflection-type polarization prisms 420B and 420 R) thereof, corresponding to B-light and R-light, and the cross dichroic prisms 410 building up the color synthesizing device, it is possible to change the incident lights upon that prisms into the S-polarized lights, and thereby obtaining preferable dichroic characteristics.

As is apparent from the above, with the projection-type image display apparatuses, according to the embodiments 1 to 3, enabling the cross dichroic prisms, each being attached with the display element thereon, to be mounted detachably, it is possible to exhibit or keep the desired optical performances thereof, always, by exchanging the prisms with a new image display element portion, depending upon the necessity, accompanying with deterioration of the performances thereof, with simple works.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A projection-type image display apparatus, comprising:
a light source;
first and second multi-lenses for equalizing intensities of lights from said light source;
a polarized-light conversion element for unifying polarization directions of the lights from said first and second multi-lenses;
a color separation portion for separating the lights from said polarized-light conversion element into a plural number of colors;
a plurality of transmission-type image display elements, each being disposed corresponding to each of said plural number of light colors;
an optical synthesizing portion, for synthesizing the lights from said plurality of transmission-type image display elements, each different surface thereof being attached with one of said plurality of transmission-type image display elements, respectively in such a manner that the transmission-type image display elements can be freely attached and detached;
a seat portion, including a plurality of projection frame portions, on which one face of the optical synthesizing portion is mounted to permit accurate positioning of the optical synthesizing portion;
a projection lens for projecting light from said optical synthesizing portion;
a supporting portion for supporting said optical synthesizing portion thereon; and
a housing for disposing said first and second multi-lenses, said polarized-light conversion element and said color separation portion therein, wherein said housing is sealed by said first multi-lens, said housing including a recessed portion in an outer wall of the housing, said recessed portion being located adjacent to said projection lens and including collimator lens being located in said recessed portion,
wherein said plurality of transmission-type image display elements and said optical synthesizing portion are located in said recessed portion, outside of said housing to facilitate easy access for accurately attaching the transmission-type image display elements and for easily detaching the transmission-type image display elements, as desired for repair or replacement,
wherein said optical synthesizing portion includes cross dichroic prisms,
wherein said cross dichroic prisms include jigs, disposed corresponding to each of said plurality of transmission-type image display elements, each of which is comprised of a metal plate and include a projection, and wherein said plurality of transmission-type image display elements are attached on said jigs,
wherein, on one surface of the seat portion a projecting portion is formed for positioning said cross dichroic prisms, and on another surface thereof being mounted said cross dichroic prisms abutting on a surface different from a surface on which said plurality of transmission-type image display elements are attached,
further comprising a member for absorbing reflection light upon said projection lens between said cross dichroic prisms and said projection lens, and
wherein said member for absorbing reflection light is comprised of a reflection-type polarization plate and an absorption-type polarization plate located substantially parallel to one another between the cross dichroic prisms and the projection lens.

2. The projection-type image display apparatus according to claim 1, wherein said plural number of colors include R-color, G-color and B-color.

3. The projection-type image display apparatus according to claim 1, wherein the light source is located outside the housing.

* * * * *